US006463104B1

(12) United States Patent
Dirr

(10) Patent No.: US 6,463,104 B1
(45) Date of Patent: Oct. 8, 2002

(54) METHOD OF INCREASING CODING LEVELS

(76) Inventor: Josef Dirr, Neufahrner Str. 5, D-81679 Munich (DE)

( * ) Notice: Subject to any disclaimer, the term of this patent is extended or adjusted under 35 U.S.C. 154(b) by 0 days.

(21) Appl. No.: 09/281,773

(22) Filed: Mar. 30, 1999

(30) Foreign Application Priority Data

Jun. 26, 1998 (DE) .......................... 198 28 631
Aug. 17, 1998 (DE) .......................... 198 37 228

(51) Int. Cl.$^7$ .......................... H04L 27/00; H03K 7/00; H03K 9/00; H03M 1/00
(52) U.S. Cl. .......................... 375/259; 375/237; 375/239; 341/179
(58) Field of Search .................. 375/302, 237, 375/239, 259, 268, 269, 271, 279, 286; 258/261.1, 262.1; 341/179, 109, 56; 370/212, 213

(56) References Cited

U.S. PATENT DOCUMENTS

| 3,847,732 | A | * | 11/1974 | Perreault | 358/261.1 |
| 5,050,188 | A | * | 9/1991 | Dirr | 375/260 |
| 5,581,368 | A | * | 12/1996 | Dirr | 358/426 |
| 5,587,797 | A | * | 12/1996 | Dirr | 358/261.1 |
| 5,675,609 | A | * | 10/1997 | Johnson | 375/237 |
| 6,072,829 | A | * | 6/2000 | Dirr | 375/239 |

FOREIGN PATENT DOCUMENTS

| DE | 19707290 | 2/1997 | .......... H04L/27/32 |
| WO | WO98/14042 | 12/1997 | |

* cited by examiner

*Primary Examiner*—Stephen Chin
*Assistant Examiner*—Lenny Jiang
(74) *Attorney, Agent, or Firm*—Nields & Lemack

(57) ABSTRACT

This invention concerns a method of increasing coding levels. In this method, an increase in levels is achieved with multi-level coding, where uninterrupted periodic sequences such as an alternating current of the same frequency and phase relation are provided as the code elements, and where the code elements are flagged with respect to one another by changes in amplitude; this increase in levels is achieved by the fact that the next code element begins or ends either with a positive or negative half-period, so that two levels can be marked with one code element. This has the effect, for example, that six levels are obtained instead of three. In numbers, this means that with three levels and two, three, four and five places there are 9, 27, 81 and 243 combinations, and with six levels and two, three four and five places there are 36, 216, 1296 and 7776 combinations.

23 Claims, 4 Drawing Sheets

4PSK

16QAM

METHOD OF INCREASING CODING LEVELS

TECHNICAL FIELD

The present invention concerns digital transmission of information. Higher-order coding is provided for better utilization of transmission paths. Such coding has been done by line conduction, by wireless routes and over optical fibers.

STATE OF THE ART

Known methods in this regard include ASK (amplitude shift keying), FSK (frequency shift keying) and PSK (phase shift keying). Recently methods have also been disclosed where the phase relation of pulses (German Patent No. 4,345,253, U.S. Pat. No. 5,587,797) and the pulse duration (PCT/EP97/07196-WO98/14042) have been used as coding levels in that an alternating current of a frequency and a phase relation with a predetermined number of periods has been used for this purpose, and the levels were changed by increasing or decreasing the number of periods.

SUMMARY OF THE INVENTION

The object of this invention is to provide a method whereby it is possible to increase the coding levels with simple means, namely for codes where the code elements consist of an uninterrupted periodic sequence, e.g., with an alternating current of the same frequency, and where the following code element is differentiated by a change in amplitude. An increase in the number of levels is achieved by flagging the beginning or the end of the amplitude code element marking with positive or negative elements, e.g., with a positive or negative half-period. If the periodic sequence is an alternating current, it can also be provided directly as a transmission alternating current, i.e., no separate carrier is then necessary. The method according to this invention is apparent from Patent claim 1.

METHODS OF EMBODING THE INVENTION

Figure 1A:
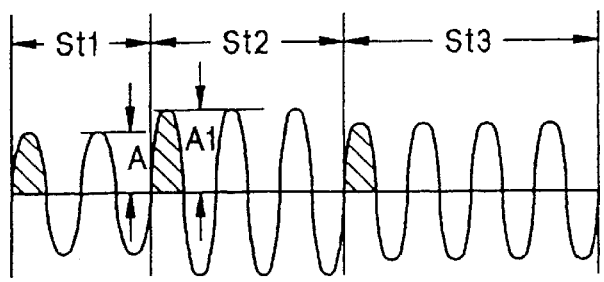
FIGS. 1*a, b*: code elements with a positive and negative beginning.
Figure 1B:
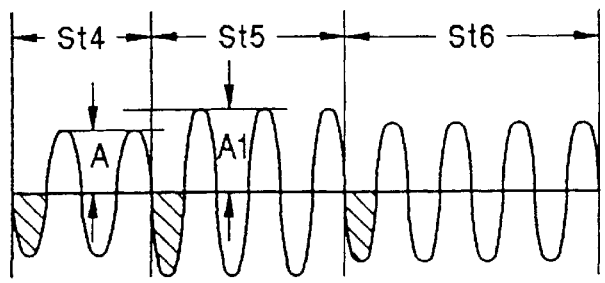

FIGS. 1*a* and 1*b* show code elements which are determined by a predetermined number of periods of an alternating current of one frequency and the plus or minus sign in front of the first half-period. Two, three and four periods are assigned to the levels. In FIG. 1*a*, the levels begin with a positive half-period. According to this invention, one then obtains three additional levels, for example, if the levels are begun with a negative half-period, as shown in FIG. 1*b*. Expressed in numbers, this means that with three levels and two, three, four or five digits there are 9, 27, 81 and 243 combinations, and with six levels and two, three, four and five digits there are 36, 216, 1296 and 7776 combinations.

Figure 2:
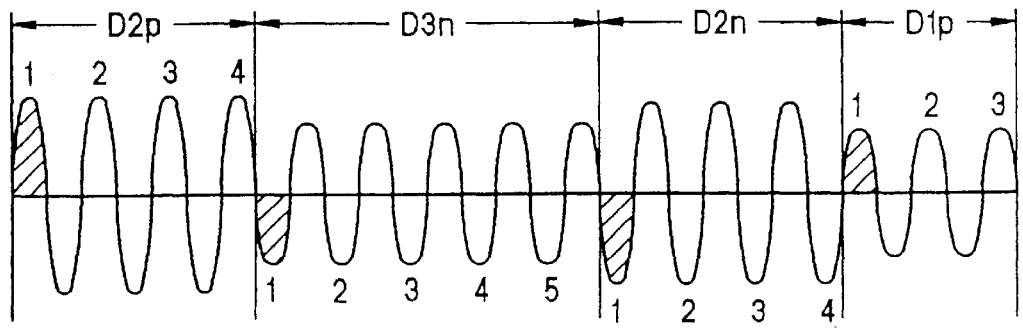
FIG. 2: a four-digit code word consisting of four code elements with a different pulse duration.

FIG. 2 shows a four-digit code word with the three levels of three, four and five periods based on pulse durations. Four periods with a positive beginning are assigned to the first place D2*p*. Five periods with a negative beginning are assigned to the second place D3*n*, four periods with a negative beginning are assigned to the third digit D2*n*, and three periods with a positive beginning are assigned to the fourth digit D1*p*. Since the positive and negative beginnings of the pulses are utilized, this yields six levels, thus permitting 1296 combinations.

Figure 3:
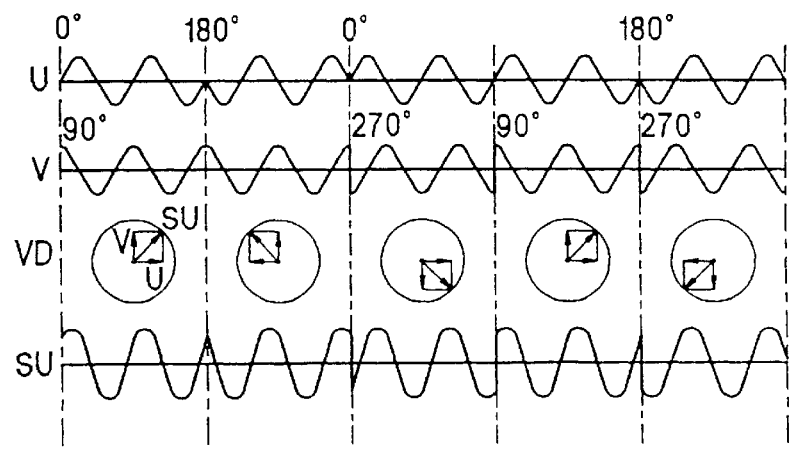
FIG. 3: the principle of generation of 4 PSK.
Figure 4:
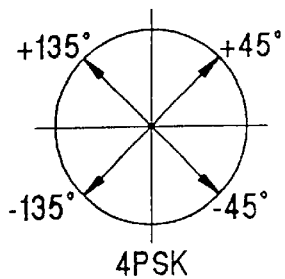
FIG. 4: a vector diagram of 4 PSK.
Figure 5:
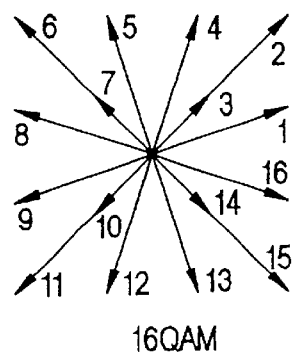
FIG. 5: a vector diagram of 16 QAM.

FIG. 3 shows how the four phase levels are generated in 4PSK. Alternating currents u and v with a 90° phase displacement are each phase-displaced by 180° and added for the transmission. This yields the four phase shifts +45°, +135°, −135° and −45 in the cumulative alternating current SU, as shown in FIG. 4. For this reason, the hardware for this phase coding is very expensive. In the past, coding has also been performed with 16 QAM, as illustrated in FIG. 5. However, FIG. 5 shows how complicated and difficult decoding is here.

The present invention avoids these disadvantages by requiring only detection of the change in amplitude and the plus or minus sign of the beginning or ending half-wave, combined with counting of the periods or half-periods, in decoding.

Figure 6:
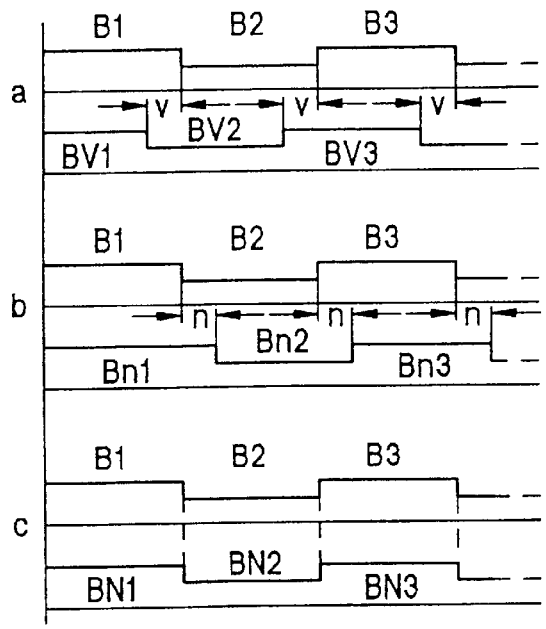
FIG. 6: the principle of coding phase levels with an alternating current.

FIG. 6 illustrates the principle of phase decoding with just one alternating current with one frequency and phase relation with a reference phase relation. Differential phase relations or absolute phase relations may also be provided. FIG. 6*a* shows the reference phase relations B1, B2, . . . , the leading phase relations BV1, BV2, . . . , and the leading phase difference v. FIG. 6*b* shows the lagging phase relations Bn1, Bn2, . . . and the lagging phase difference n. FIG. 6*c* shows the coding pulses BN1, BN2, . . . which have the same phase relation as the reference pulses. For example, a predetermined number of periods of an alternating current are assigned to the pulses with reference phase relation B1, B2, . . . Then increasing or reducing the respective pulse with one or more periods in comparison with the reference pulse (v or n) yields the desired phase relation.

Figure 7:
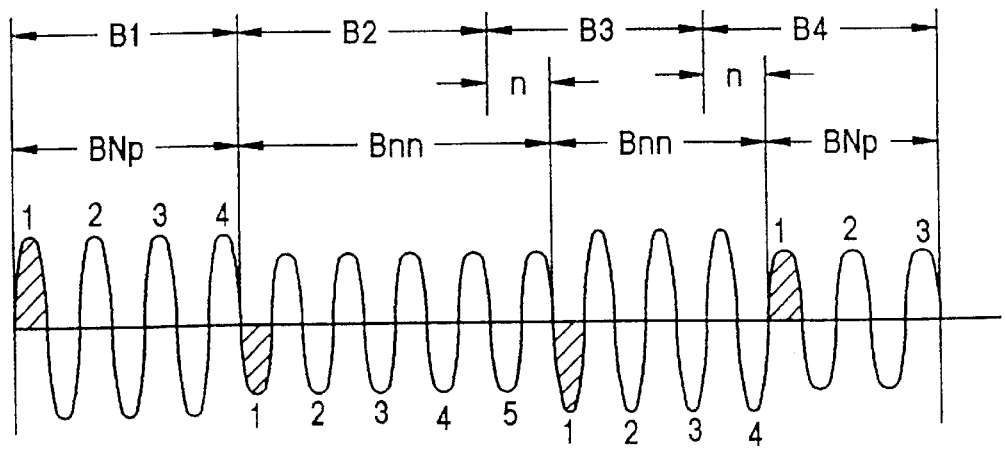
FIG. 7: a code word with three phase levels and four digits.

FIG. 7 shows an example of such phase coding, where B1 through B4 are reference phase pulses. Four periods of an alternating current of the same frequency and phase relation are assigned to the reference pulse. BN*p* is a pulse with a phase relation of the reference pulse B1 and begins with a positive half-wave. B*nn* is a lagging pulse and is therefore increased by one period and begins with a negative half-wave.

The following pulse B*nn* retains its lagging phase relation and also begins with a negative half-wave. Since this retains the same phase relation as B*nn*/B2, it needs only the period number of the reference pulse. The next pulse BN*p*/B4 in turn has the phase relation of the reference pulse and therefore retains one period less than the reference pulse. The beginning of the code element is again positive. Thus, in this example, four levels are provided, namely two normal phase relations BN with a positive and negative beginning and two lagging phase relations with a positive and negative beginning of the half-period. The code word itself consists of BNp, Bnn, Bnn and BNp. In this type of coding, half-waves can also be eliminated, as shown in FIG. 7, if the periods are always counted from their beginning, for example. In FIG. 7, for example, BNp/B1 1, 2, 3, 4–Bnn/B3 1, 2, 3, 4–BNp/B4 1, 2, 3.

Figure 9:
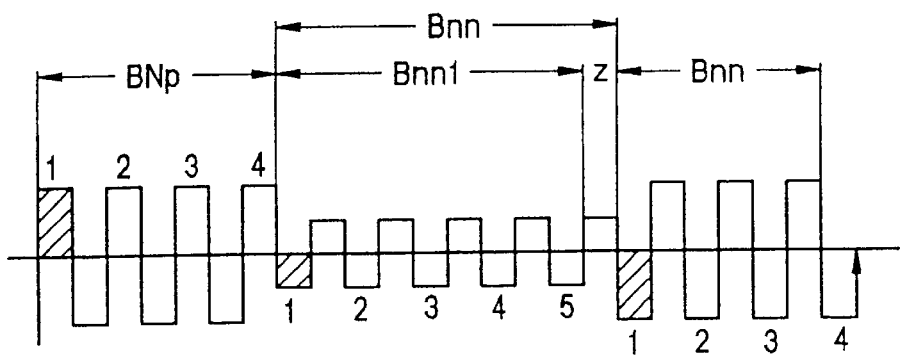
FIG. 9: code word of square-wave pulses according to this invention.

FIG. 9 shows a code word, where square-wave pulses are used as elements. Other pulses such as saw-tooth pulses could be provided as the periodic sequence. The first pulse BNp consists of seven half-periods and has a length of four. With the second pulse Bnn there are ten half-periods, and with the third pulse Bnn there are seven half-periods. If the third pulse were to begin with a positive half-period, the second pulse Bnn1 would retain only nine half-periods with the same coding, and the third pulse Bnn would have eight halfperiods, because the half-period z would belong to the third pulse.

Figure 12:
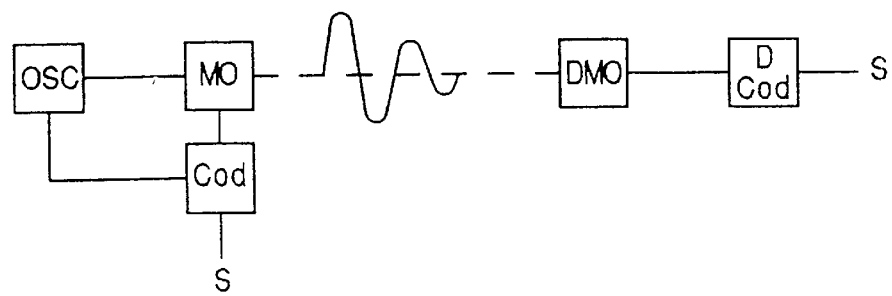
FIG. 12: principle of coding/decoding and transmission when using an alternating current of one frequency.

FIG. 12 illustrates a principle of a circuit for the coding, transmission and decoding of information according to this invention. The coding AC current is generated in the oscillator Osc and sent to the modulator MO and coder Cod. The information is sent to the coder over S. According to the code, the periods or half-periods are counted in the coder, and a change in amplitude is produced in the modulator after each code element. The coding AC current can then be applied directly to the transmission path. Then the information is converted to the original state in the demodulator and decoder (DMO/Dcod). The circuit principle shows that simple hardware is sufficient.

Figure 8:
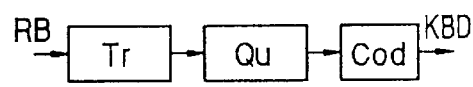
FIG. 8: principle of data reduction.

This coding may of course also be used in data reduction. A block diagram is shown for this in FIG. 8. The raw image RB is sent to a transformer Tr and subsequently to a quantizer. The compressed and quantized (Qu) image information is sent as compressed image data KBD on the transmission path by way of coder Cod.

Figure 10:
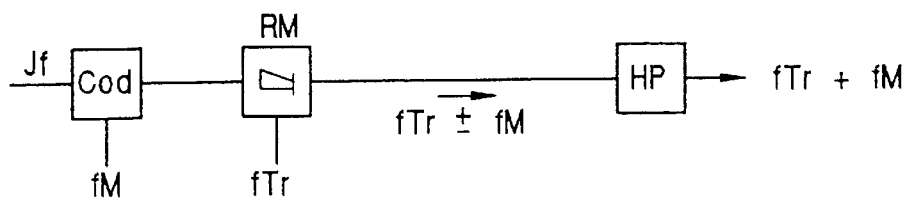
FIG. 10: principle of transmission of coding a.c. currents by means of carriers.

Of course, the coding AC current can also be transmitted by means of carrier. FIG. 10 illustrates such a schematic diagram. Coding AC current fM and information Jf are sent to the coder Cod. The coded AC current is sent to ring modulator RM to which the carrier fTr is also sent. Then an upper side frequency fTr+fM and a lower side frequency fTr−fM are obtained at the output of the ring modulator. Then the lower side frequency is suppressed with a high-pass filter HP, so that only fTr+fM reaches the transmission path.

Figure 11:
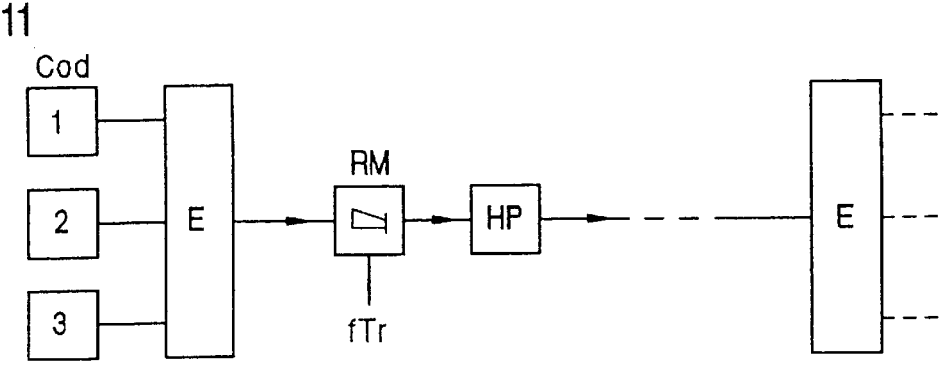
FIG. 11: principle of transmission of multiple coding a.c. currents by means of carriers.

FIG. 11 shows the circuit principle for transmission of multiple coding AC currents over a carrier frequency system. Of the three coders 1, 2, 3, coding AC currents f1, f2, f3 are sent from the three coders 1, 2, 3 to ring modulator RM over buffer E. The carrier is connected to the ring modulator via fTr. Then upper and lower sidebands are obtained at the output of the ring modulator. The lower sideband is suppressed with high-pass filter HP, so that the sideband fTr+(f1, f2, f3) goes onto the conduction path. On the receiving end, the three frequencies can be separated by means of filters or sent to appropriate resonant circuits via buffers and subsequently decoded. With a similar arrangement, three additional channels can be transmitted over the lower sideband, suppressing the upper sideband. Coding AC currents and one or more carriers will be selected so that the frequency band of the transmission channel is most favorably utilized.

The levels can be further increased by using quadrature amplitude modulation (QAM), where two coding AC currents of the same frequency are phase-displaced by 90° and the code elements are distributed on them. This will be illustrated on an example. For example, if code elements with a period length of three, four or five are used, this at first yields three levels. If they are marked with a positive and a negative beginning according to this invention, this already yields six levels. With the 90°-phase-displaced coding AC current (phase quadrature), the same number of levels are provided, thus yielding 6×6=36 levels, if one code element from one coding a.c. current is combined with one code element from the other coding AC current to form one code element.

In another preferred embodiment of this invention, the two coding AC currents are coded in such a way as to yield an increase in the number of digits in the code word by combining the code elements of both coding AC currents in one code word. This yields an increase in levels, whether in parallel or serially. Two or more in-phase coding AC currents may also be provided if they are modulated onto such carriers that the upper and lower side frequencies have a sufficient signal-to-noise ratio. Then the unwanted side frequencies are filtered out by using filters.

It is also advantageous to use two or more alternating currents of different frequencies for the transmission. Different transmission paths with alternating currents of the same and/or different frequencies and also with different level criteria are preferably also used. The allowed signal-to-noise ratio is always maintained here.

Figure 13:
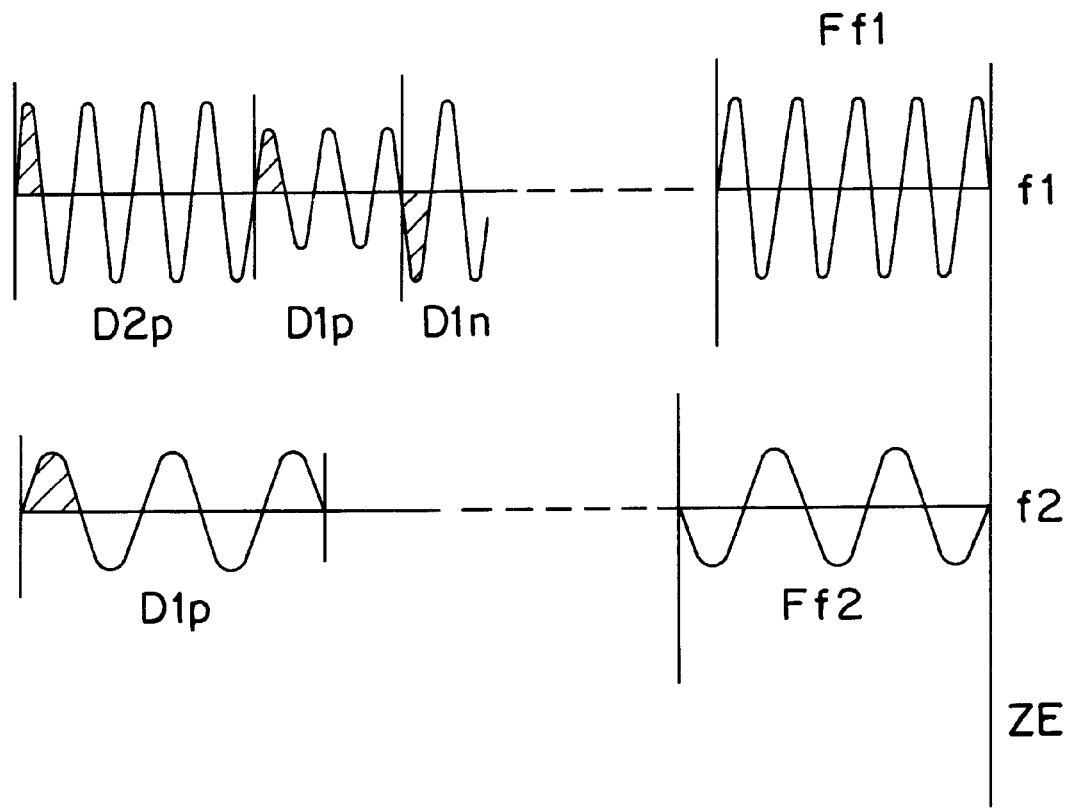
FIG. 13: example of coding with two alternating currents of different frequencies.

FIG. 13 illustrates an example of coding with two alternating currents of different frequencies. Then filling code elements are necessary in transmission of one line or one block. The end of a line, for example, can be detected by counting the code elements/code words. A predetermined line time for the effective transmission time determines the length of the filling code elements. In FIG. 13, for example, a filling code element Ff1 is necessary for the frequency f1, for example, and filling code element Ff2 is necessary for frequency f2. A small tolerance can be assigned to the end of the line ZE for the two frequencies. On the receiving end, the code elements must be stored, and in decoding, the code elements of the two frequencies are combined again according to the transmission code.

In code multiplex transmission of all signals in color television, 12 bits=4096 combinations are required. If three, four, five and six periods with a positive and negative beginning are provided for the levels, this yields eight levels. With four digits per code word, this is 4096 combinations. On the average 4.5 periods are needed per code element, i.e., 4.5×4=18 periods for a code word. With a sampling of 5 MHZ, a 90 MHZ coding a.c. current is then required if there is to be storage on the transmitting and receiving ends. If one wants to transmit directly at the sampling frequency, a higher frequency must be selected and the code word must also be enlarged by one filling code element.

In the examples, the positive or negative half-period feature was always provided at the beginning of the respective code element for increasing the levels. This feature can also be provided at the end of the code element.

What is claimed is:

1. Method for a multi-level coding of information, the levels being formed from code elements with varying numbers of half-periods and an increasing of these levels is achieved in that the first or last half-wave of the respective code element starts or ends positive or negative, each following code element is marked by an amplitude change, the code words are formed from two or more code elements of positive and negative half-periods, which are transmitted in an uninterrupted sequence with constant frequency and phase.

2. A method according to claim 1, further comprising the steps of:

providing the phase relations of pulses to reference pulses or to a preceding pulse as levels, wherein all pulses are characterized by periods or half-periods, and changing the phase relations by increasing or decreasing the number of periods or half-periods.

3. A method according to claim 2, further comprising the step of:

distributing at least one of the levels between two alternating currents with a 90° phase displacement when using alternating currents of one frequency and phase relation as the periodic sequence, and adding said at least one level or digit for transmission.

4. A method according to claim 2, further comprising the step of:

transmitting the periodic sequences by means of carriers.

5. A method according to claim 2, further comprising the step of:

distributing at least one of the code elements or code words between two or more sequences of different frequencies.

6. A method according to claim 2, further comprising the step of:

always counting the half-period elements on the side with the positive or negative characterization in coding and decoding.

7. A method according to claim 2, further comprising the step of:

analyzing one or more coding AC currents contained in the upper or lower side frequency or contained in the upper or lower sideband in carrier frequency transmission having an upper and lower side frequency and an upper and lower sideband by means of resonant circuits.

8. A method according to claim 1, further comprising the step of:

providing the duration of pulses or the duration of the difference in comparison with the preceding pulse as a level, wherein the levels are characterized by integral periods or half-periods, and changing the code element by an increase or decrease in number of periods or half-periods.

9. A method according to claim 8, further comprising the step of:

distributing at least one of the levels between two alternating currents with a 90° phase displacement when using alternating currents of one frequency and phase relation as the periodic sequence, and adding said at least one level or digit for transmission.

10. A method according to claim 8, further comprising the step of:

transmitting the periodic sequences by means of carriers.

11. A method according to claim 8, further comprising the step of:

distributing at least one of the code elements or code words between two or more sequences of different frequencies.

12. A method according to claim 8, further comprising the step of:

always counting the half-period elements on the side with the positive or negative characterization in coding and decoding.

13. A method according to claim 8, further comprising the step of:

analyzing one or more coding AC currents contained in the upper or lower side frequency or contained in the upper or lower sideband in carrier frequency transmission having an upper and lower side frequency and an upper and lower sideband by means of resonant circuits.

14. A method of claim 1, further comprising the step of: providing square-wave pulses or saw-tooth pulses as an uninterrupted periodic sequence.

15. A method according to claim 14, further comprising the step of:

transmitting the periodic sequences by means of carriers.

16. A method according to claim 14, further comprising the step of:

distributing at least one of the code elements or code words between two or more sequences of different frequencies.

17. A method according to claim 14, further comprising the step of:

always counting the half-period elements on the side with the positive or negative characterization in coding and decoding.

18. A method according to claim 1, further comprising the step of:

distributing at least one of the levels between two alternating currents with a 90° phase displacement when using alternating currents of one frequency and phase relation as the periodic sequence, and adding said at least one level or digit for transmission.

19. A method according to claim 1, further comprising the step of:

transmitting the periodic sequences by means of carriers.

20. A method according to claim 1, further comprising the step of:

distributing at least one of the code elements or code words between two or more sequences of different frequencies.

21. A method according to claim 20, further comprising the step of:

transmitting each of the sequences over different transmission paths.

22. A method according to claim 1, further comprising the step of:

always counting the half-period elements on the side with the positive or negative characterization in coding and decoding.

23. A method according to claim 1, further comprising the step of:

analyzing one or more coding AC currents contained in the upper or lower side frequency or contained in the upper or lower sideband in carrier frequency transmission having an upper and lower side frequency and an upper and lower sideband by means of resonant circuits.

* * * * *